US011523312B2

(12) United States Patent
Yang

(10) Patent No.: US 11,523,312 B2
(45) Date of Patent: Dec. 6, 2022

(54) CAPABILITY INTERACTION METHOD AND RELATED DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 14 days.

(21) Appl. No.: 16/942,702

(22) Filed: Jul. 29, 2020

(65) Prior Publication Data
US 2020/0359279 A1    Nov. 12, 2020

Related U.S. Application Data

(63) Continuation of application No. PCT/CN2019/092191, filed on Jun. 21, 2019.

(30) Foreign Application Priority Data

Jun. 21, 2018   (CN) .......................... 201810643850.1

(51) Int. Cl.
*H04W 36/00*   (2009.01)
*H04W 36/22*   (2009.01)
*H04W 72/04*   (2009.01)

(52) U.S. Cl.
CPC ... *H04W 36/0072* (2013.01); *H04W 36/0058* (2018.08); *H04W 36/22* (2013.01); *H04W 72/048* (2013.01)

(58) Field of Classification Search
CPC ......... H04W 36/0072; H04W 36/0058; H04W 36/22; H04W 72/048; H04W 36/00835;
(Continued)

(56) References Cited

U.S. PATENT DOCUMENTS

2014/0080484 A1   3/2014 Centonza
2014/0092866 A1   4/2014 Teyeb
(Continued)

FOREIGN PATENT DOCUMENTS

CN    103889009 A    6/2014
CN    105991255 A    10/2016
(Continued)

OTHER PUBLICATIONS

Third Office Action of the Chinese application No. 202010340406.X, dated Nov. 15, 2021. 13 pages with English translation.
(Continued)

*Primary Examiner* — Marisol Figueroa
(74) *Attorney, Agent, or Firm* — Perkins Coie LLP

(57) ABSTRACT

A capability interaction method and a related device capable of enabling a network device to learn about capability information of an adjacent network device. The method comprises: obtaining capability information of at least one adjacent network device and/or at least one adjacent cell; and determining, on the basis of the capability information of the adjacent network device and/or at least one adjacent cell, a configuration of a radio resource for at least one terminal device.

18 Claims, 3 Drawing Sheets

(58) Field of Classification Search
CPC ... H04W 76/16; H04W 36/0069; H04W 8/14; H04W 24/02; H04W 24/10; H04W 36/0061
See application file for complete search history.

(56) References Cited

U.S. PATENT DOCUMENTS

| | | | |
|---|---|---|---|
| 2014/0206361 | A1 | 7/2014 | Centonza et al. |
| 2014/0293958 | A1 | 10/2014 | Teyeb et al. |
| 2016/0037399 | A1 | 2/2016 | Li |
| 2016/0212775 | A1 | 7/2016 | Xu et al. |
| 2016/0337911 | A1* | 11/2016 | Engström ............... H04L 5/001 |
| 2016/0380779 | A1 | 12/2016 | Sharma et al. |
| 2017/0346525 | A1 | 11/2017 | Stirling-Gallacher et al. |
| 2018/0124661 | A1 | 5/2018 | Tsai |
| 2018/0132144 | A1 | 5/2018 | Li |
| 2019/0068237 | A1 | 2/2019 | Stirling-Gallacher et al. |
| 2019/0306728 | A1* | 10/2019 | Lei ....................... H04W 16/32 |
| 2020/0021452 | A1 | 1/2020 | Sharma et al. |

FOREIGN PATENT DOCUMENTS

| | | |
|---|---|---|
| CN | 106162666 A | 11/2016 |
| CN | 106162687 A | 11/2016 |
| CN | 107666727 A | 2/2018 |
| CN | 108024297 A | 5/2018 |
| EP | 3100490 A1 | 12/2016 |
| EP | 3337235 A1 | 6/2018 |
| WO | 2015094074 A1 | 6/2015 |
| WO | 2016020000 A1 | 2/2016 |

OTHER PUBLICATIONS

Notice of Rejection of the Chinese application No. 202010340406. X, dated Feb. 8, 2022. 11 pages with English translation.
Orange: "Overlaid coverage scenario showcase—performances and solution requirements", 3GPP Draft: R3-140241, 3rd Generation Partnership Project (3GPP), Mobile Competence Centre; 650, Route Desucioles; F-06921 Sophia-Antipolis Cedex; France vol. RAN WG3, No. Prague, Czech; Feb. 10, 2014-Feb. 14, 2014 Jan. 31, 2014(Jan. 31, 2014), XP050755649.
Catt: "CP procedures for LTE and NR interworking", 3GPP Draft; R2-164712 CP Procedures for LTE and NR Nterworking, 3rd Generation Partnership Project (3GPP), Mobile Competence Centre: 650, Route Deslucioles: F-06921 Sophia-Antipolis Cedex; FRANCEvol. RAN WG2, No. Göteborg; Aug. 22, 2016-Aug. 26, 2016 Aug. 21, 2016(Aug. 21, 2016), XP051126475.
Partial Supplementary European Search Report in the European application No. 19823171.4, dated Mar. 22, 2021.
Written Opinion of the International Search Authority in the international application No. PCT/CN2019/092191, dated Sep. 20, 2019.
Supplementary European Search Report in the European application No. 19823171.4, dated Jun. 22, 2021. 13 pages.
3GPP TSG-RAN WG2 Meeting #99 Tdoc R2-1708032, Berlin, Germany, Aug. 21-25, 2017, Agenda Item: 10.2.6.3—NR—Stage-2—UE capabilities—Coordination, Source: Ericsson, Title: UE capability coordination for LTE-NR interworking, Document for: Discussion, Decision. 9 pages.
First Office Action of the Chinese application No. 202010340406.X, dated Jun. 24, 2021. 18 pages with English translation.
Second Office Action of the Chinese application No. 202010340406. X, dated Sep. 8, 2021.13 pages with English translation.
First Office Action of the Indian application No. 202017042901, dated Aug. 11, 2021. 5 pages with English translation.
International Search Report in the international application No. PCT/CN2019/092191, dated Sep. 20, 2019.
3GPP TS 37.340 V15.1.0 (Mar. 2018), 3rd Generation Partnership Project; Technical Specification Group Radio Access Network; Evolved Universal Terrestrial Radio Access (E-UTRA) and NR; Multi-connectivity Stage 2 (Release 15).
First Office Action of the European application No. 19823171.4, dated Mar. 24, 2022. 9 pages.
Nokia et al.: "(TP for NSA BL CR) TAC introduciton", 3GPP TSG-RAN WG3 #99; R3-181053; Athens, Greece; Feb. 26, 2018-Mar. 2, 2018 Feb. 16, 2018 (Feb. 16, 2018), XP051401562. 2 pages.
Qualcomm Incorporated: "Support of extended TAC in Roaming and Access Restrictions for EN-DC", 3GPP TWG-RAN WG3 Meeting #99bis; R3-181932; Sanya, China; Apr. 16, 2018-Apr. 20, 2018 Apr. 6, 2018 (Apr. 6, 2018), XP051416933. 2 pages.
Vivo: "Report of email discussion [101bis#47][NR] ANR", 3GPP TSG-RAN WG2; Meeting #102; R2-1807626; Busan, Korea; May 21, 2018-May 25, 2018 May 11, 2018 (May 11, 2018), XP051464810. 19 pages.

* cited by examiner

US 11,523,312 B2

CAPABILITY INTERACTION METHOD AND RELATED DEVICE

CROSS-REFERENCE TO RELATED APPLICATION

This is a continuation application of International Patent Application No. PCT/CN2019/092191, filed on Jun. 21, 2019, which claims priority to Chinese Patent Application No. 201810643850.1, filed on Jun. 21, 2018, the entire contents of which are incorporated herein by reference in their entirety.

TECHNICAL FIELD

The disclosure relates to the technical field of information processing, and particularly to a method for capability interaction, a terminal device, a network device, a computer storage medium, a chip, a computer-readable storage medium, a computer program product and a computer program.

BACKGROUND

At present, disclosure scenarios of 5th-Generation (5G) communication mainly include Enhanced Mobile Broadband (eMBB), Ultra-Reliable Low-Latency Communication (URLLC), and Massive Machine Type Communication (mMTC). During early deployment of New Radio (NR), it is difficult to implement complete NR coverage, and thus typical network coverage is in a mode in which wide area Long Term Evolution (LTE) coverage and an NR island coverage mode are combined. Moreover, LTE is mostly deployed below 6 GHz, and there are few spectrums for 5G below 6 GHz, so researches on disclosure of spectrums above 6 GHz for NR are required. However, a high band is limited in coverage and fast in signal fading.

For ensuring signaling transmission reliability, it is proposed that a signaling radio bearer (SRB) 1 and SRB2, i.e., split SRB1 and split SRB2, at a Master Node (MN) side may be transmitted at a secondary node (SN) side at the same time. However, for such a system architecture, utilization efficiency of system radio resources still needs to be improved.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Figure 1:
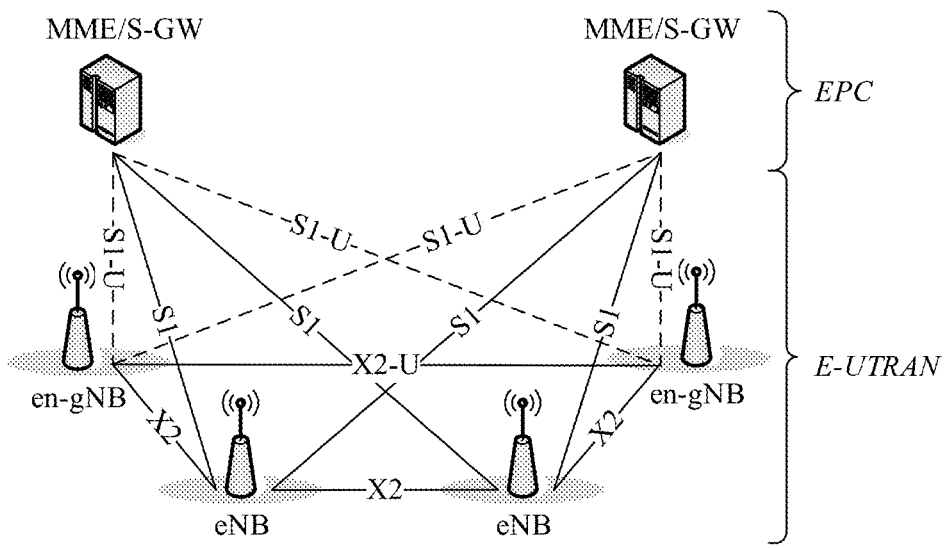
FIGS. 1-3 are schematic diagrams of a network deployment and networking architecture of dual connectivity (DC).
Figure 2:
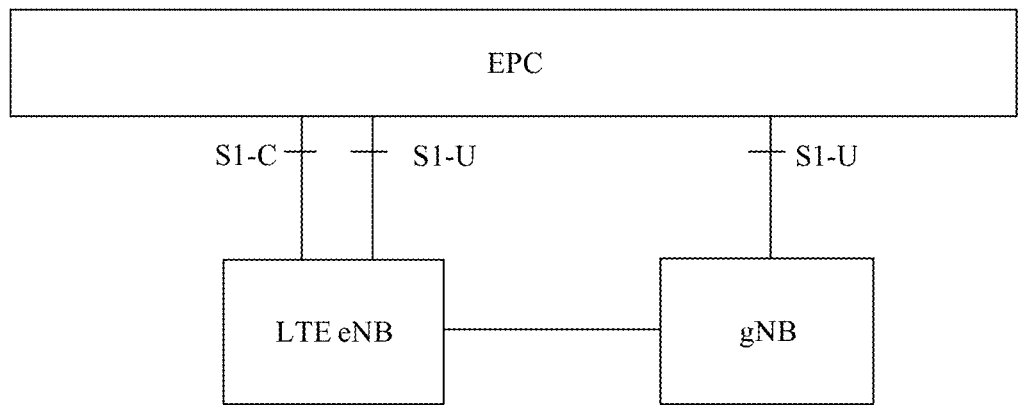
Figure 3:
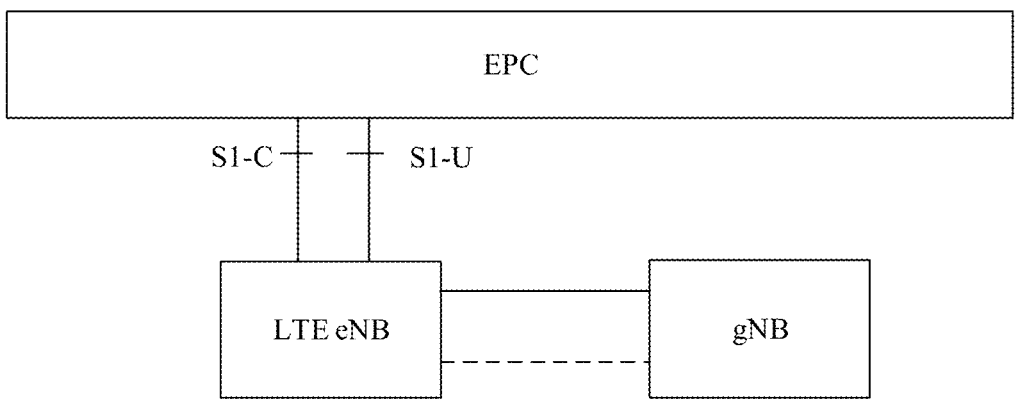
Figure 4:
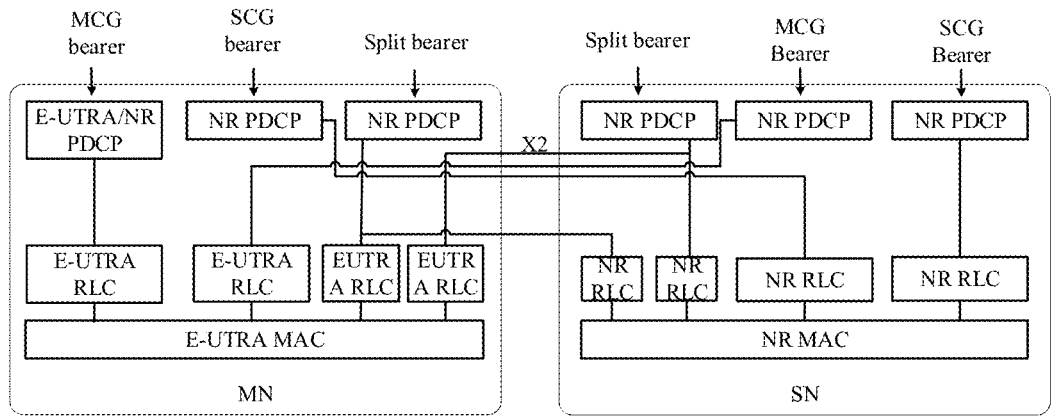
FIG. 4 is a schematic diagram of bearer types in a DC mode.

The 3rd Generation Partnership Project (3GPP) completed the first 5G version, i.e., Evolved Universal Terrestrial Radio Access (E-UTRA)-NR DC (EN-DC) (LTE-NR DC), before the end of December in 2017. Here, an LTE node is an MN, an NR node is an SN, and a network deployment and networking architecture is illustrated in FIG. 1 to FIG. 3. DC includes EN-DC, NR-E-UTRA DC (NE-DC), 5th-Generation Core (5GC)-EN-DC and NR DC. In EN-DC, an LTE node is an MN, an NR node is an SN, and an Evolved Packet Core (EPC) is connected. In NE-DC, an NR node is an MN, an Enhanced LTE (eLTE) node is an SN, and a 5GC is connected. In 5GC-EN-DC, an eLTE node is an MN, an NR node is an SN, and the 5GC is connected. In NR DC, an NR node is an MN, an NR node is an SN, and the 5GC is connected. Bearer types in a DC mode are illustrated in FIG. 4. In LTE DC, bearer types of a user plane include a Master Cell Group (MCG) bearer, a Secondary Cell Group (SCG) bearer and an MCG split bearer. For minimizing a change between an MCG split bearer and an SCG split bearer, the concept of bearer harmonization is proposed, namely the MCG split bearer and the SCG split bearer are collectively referred to as split bearers.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 5:
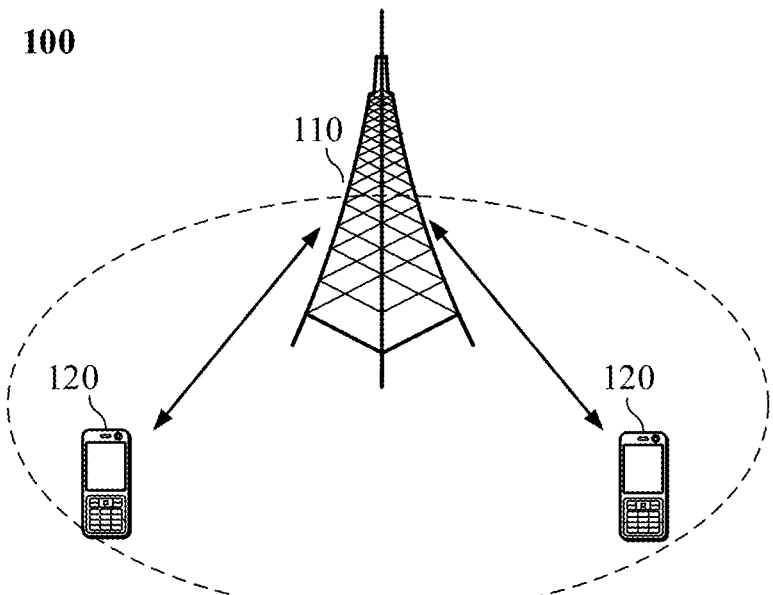
FIG. 5 is a first architecture diagram of a communication system according to an embodiment of the disclosure.

Exemplarily, a communication system 100 that the embodiments of the disclosure are applied to is illustrated in FIG. 5. The communication system 100 may include a network device 110, and the network device 110 may be a device communicating with a terminal device 120 (or called a communication terminal and a terminal). The network device 110 may provide communication coverage for a specific geographical region, and may communicate with a terminal device located in the coverage. Alternatively, the network device 110 may be a Base Transceiver Station (BTS) in the GSM or the CDMA system, or may be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle-mounted device, a wearable device, a hub, a switch, a network bridge, a router, a network-side device in a future 5G network, a network device in a future evolved Public Land Mobile Network (PLMN) or the like.

The communication system 100 further includes at least one terminal device 120 within the coverage of the network device 110. A "terminal device" used herein includes, but is not limited to, a device arranged to receive/send a communication signal through a wired line connection, for example, through Public Switched Telephone Network (PSTN), Digital Subscriber Line (DSL), digital cable and direct cable connections, and/or another data connection/network) and/ or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. A terminal device arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in the future evolved PLMN or the like.

Alternatively, the terminal device 120 may perform Device to Device (D2D) communication.

Alternatively, the 5G system or the 5G network may also be called an NR system or an NR network.

A network device and two terminal devices are exemplarily illustrated in FIG. 5. Alternatively, the communication system 100 may include multiple network devices, and another number of terminal devices may be included in coverage of each network device. There are no limits made thereto in the embodiments of the disclosure.

Alternatively, the communication system 100 may further include another network entity such as a network controller and a mobility management entity. There are no limits made thereto in the embodiments of the disclosure.

It is to be understood that a device with a communication function in the network/system in the embodiments of the disclosure may be called a communication device. For example, for the communication system 100 illustrated in FIG. 5, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Embodiments of the disclosure provide a method for capability interaction and a related device. A network device may acquire capability information of a neighbor network device.

A first aspect provides a method for capability interaction, which may be applied to a network device and include: acquiring capability information of at least one neighbor network device and/or at least one neighbor cell; and determining a radio resource configuration for at least one terminal device based on the capability information of the neighbor network device and/or the at least one neighbor cell.

A second aspect provides a method for capability interaction, which may be applied to a terminal device and include: sending a measurement report to a network device, wherein the measurement report at least comprises: capability information of at least one neighbor network device and/or at least one neighbor cell, and identification information of the at least one neighbor network device or the at least one neighbor cell.

A third aspect provides a network device, which may include a first communication unit and a first processing unit. The first communication is configured to acquire capability information of at least one neighbor network device and/or at least one neighbor cell. The first processing unit is configured to determine a radio resource configuration for at least one terminal device based on the capability information of the neighbor network device and/or the at least one neighbor cell.

A fourth aspect provides a terminal device, which may include a second communication unit. The second communication unit is configured to send a measurement report to a network device. The measurement report at least includes capability information of at least one neighbor network device and/or at least one neighbor cell, and identification information of the at least one neighbor network device or the at least one neighbor cell.

A fifth aspect provides a network device, which may include a processor and a memory. The memory may be configured to store a computer program, and the processor may be configured to call and run the computer program stored in the memory to execute the method in the first aspect or each implementation mode thereof.

A sixth aspect provides a terminal device, which may include a processor and a memory. The memory may be configured to store a computer program, and the processor may be configured to call and run the computer program stored in the memory to execute the method in the second aspect or each implementation mode thereof.

A seventh aspect provides a chip, which is configured to implement the method in any aspect of the first aspect to the second aspect or each implementation mode thereof.

Specifically, the chip includes a processor, configured to call and run a computer program in a memory to enable a device installed with the chip to execute the method in any aspect of the first aspect to the second aspect or each implementation mode thereof.

An eighth aspect provides a computer-readable storage medium, which is configured to store a computer program, the computer program enabling a computer to execute the method in any aspect of the first aspect to the second aspect or each implementation mode thereof.

A ninth aspect provides a computer program product, which includes a computer program instruction, the computer program instruction enabling a computer to execute the method in any aspect of the first aspect to the second aspect or each implementation mode thereof.

A tenth aspect provides a computer program, which runs in a computer to enable the computer to execute the method in any aspect of the first aspect to the second aspect or each implementation mode thereof.

According to the technical solutions of the embodiments of the disclosure, the network device may perform capability information interaction with the neighbor network device and/or neighbor cell thereof to further complete radio resource configuration for the terminal device, so that a requirement of the terminal device may be met better during radio resource configuration, and utilization efficiency of a system radio resource may be improved.

Figure 6:
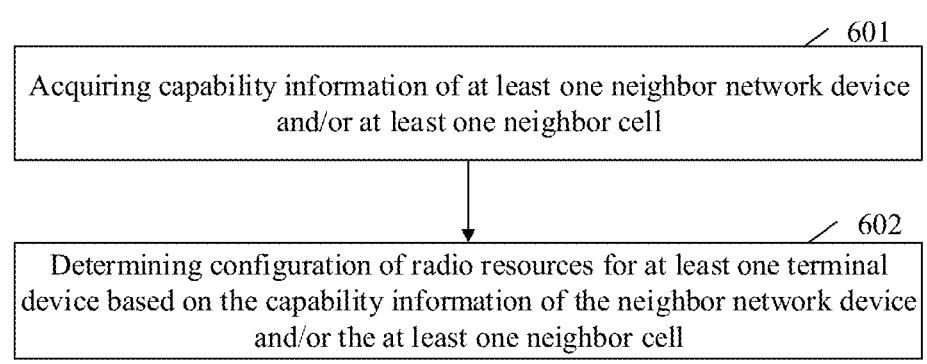
FIG. 6 is a flowchart of a method for capability interaction according to an embodiment of the disclosure.

As illustrated in FIG. 6, an embodiment of the disclosure provides a method for capability interaction, which is applied to a network device and includes the following steps.

In 601, capability information of at least one neighbor network device and/or at least one neighbor cell is acquired.

In 602, a radio resource configuration for at least one terminal device is determined based on the capability information of the neighbor network device and/or the at least one neighbor cell.

In the embodiment, the network device may be a base station in an NR, eLTE or another communication system, and may further be an MN. Correspondingly, the neighbor network device may be a base station neighboring to the MN or may be a base station determined whether to be added to be an SN for the MN.

The operation of acquiring the capability information of the neighbor network device and the neighbor cell in 601 may include the following two manners.

A first manner: the capability information of the at least one neighbor network device and/or the at least one neighbor cell is acquired through an Xn interface with the at least one neighbor network device.

It is to be pointed out that, in this processing manner, the capability information, acquired through the Xn interface, of the neighbor network device may be cell-granularity-based capability information. That is, the capability information of the neighbor network device and the capability information of the neighbor cell managed by the neighbor cell may be acquired.

The capability information includes at least one of:

connectable core network information, an NE-DC capability support indication, an SRB3 capability support indication, a split SRB1 capability support indication, a split SRB2 capability support indication, a DC-based packet data convergence protocol (PDCP) duplication capability support indication, a carrier aggregation (CA)-based PDCP duplication capability support indication, radio frequency information, load indication information, or tracking area code (TAC) information.

A Second Manner

A measurement report sent by the terminal device is acquired, the measurement report at least including: the capability information of the at least one neighbor network device or the at least one neighbor cell, and identification information of the at least one neighbor network device or the at least one neighbor cell.

Before such processing is executed, the method may further include that, a measurement configuration is sent to the terminal device. The measurement configuration is used for indicating the identification information of the neighbor network device and/or neighbor cell that the terminal device needs to measure.

That is, the terminal device in coverage is notified of information of the neighbor network device and neighbor cell to be measured at first, and then the terminal device acquires the capability information of the neighbor network device and the neighbor cell.

It is also to be understood that, in this manner, the network device may further broadcast the capability information of the network device and/or the cell.

The capability information includes, but is not limited to: the connectable core network information (for example, an EPC, and/or a 5GC, and/or both), the NE-DC capability support indication, the SRB3 capability support indication, the split SRB1 capability support indication, the split SRB2 capability support indication, the DC-based PDCP duplication capability support indication, the CA-based PDCP duplication capability support indication, the radio frequency information, the load indication information, or the TAC information.

Descriptions will be made with the condition that the network device is a base station 2 and the neighbor network device is a base station 1 as an example.

The base station 1 (which may also be the base station 1 and the base station 2) and/or a cell broadcast/broadcasts capability information of the base station and/or the cell.

The base station 2 configures the terminal device to execute measurement, indicates identification information of a neighbor base station and/or neighbor target cell that the terminal device needs to measure in a measurement configuration, and requires UE to report capability information of the neighbor base station and/or the neighbor cell.

The base station 2 receives a measurement report from the terminal device. The measurement report at least includes: capability information of at least one neighbor network device or at least one neighbor cell, and identification information of the at least one neighbor network device or the at least one neighbor cell.

The base station 2, after acquiring the measurement report of the terminal device, adds the capability information of the neighbor network device or the neighbor cell into a neighbor cell relation list based on the capability information of the at least one neighbor network device and/or the at least one neighbor cell sent by the terminal device. That is, the capability information of the neighbor base station and/or the neighbor cell is maintained in an Automatic Neighbor Relation (ANR). In other words, the capability information of the neighbor base station and/or the neighbor cell is added into the neighbor cell relation list.

The operation of determining the radio resource configuration for the at least one terminal device based on the capability information of the neighbor network device and/or the at least one neighbor cell may include: determining whether to configure, for the terminal device, a corresponding SN; and when the network device is the MN, determining whether the neighbor network device can be added to be the SN of the terminal device based on the capability information of the neighbor network device and/or the neighbor cell, such that radio resource configuration for the terminal device can be implemented. Specific descriptions will be made below.

Whether to configure the neighbor network device to be the SN is determined according to the capability information of the neighbor network device and the measurement report of the terminal device for the neighbor network device.

When the neighbor network device is added to be the SN, requirement information is configured for the neighbor network device.

The requirement information includes at least one of: an SN-side SRB3 configuration requirement indication, an SN-side split SRB1 configuration requirement indication, an SN-side split SRB2 configuration requirement indication, an SN-side DC configuration-based PDCP duplication requirement indication as well as a corresponding data radio bearer (DRB) identifier, or an SN-side CA configuration-based PDCP duplication requirement indication as well as a corresponding DRB identifier.

It is to be pointed out that, when the requirement information is configured for the neighbor network device, the neighbor network device may further determine whether it supports the requirement(s) according to the requirement information, and if NO, does not make any configuration, and may further notify the network device of feedback information indicating that it does not support at least one of the requirement(s).

Furthermore, the operation of determining whether to configure the neighbor network device to be the SN according to the capability information of the neighbor network device and the measurement report of the terminal device for the neighbor network device includes the following operation:

determining whether to configure the neighbor network device to be the SN according to at least one of the following capability information of the neighbor network device and the measurement report of the terminal device for the neighbor network device:

the connectable core network information, the NE-DC capability support indication, the SRB3 capability support indication, the split SRB1 capability support indication, the split SRB2 capability support indication, the DC-based PDCP duplication capability support indication, or the CA-based PDCP duplication capability support indication.

The measurement report for the neighbor network device may further include information such as signal quality of the neighbor network device. Elaborations are omitted herein.

That is, whether to configure the neighbor network device to be the SN is determined based on the capability information of the neighbor network device and the measurement report including the signal quality thereof.

Furthermore, at least one of the following processing may further be executed based on the radio frequency information, the load indication information and the TAC information.

When the capability information of the neighbor network device includes the radio frequency information, whether to configure the neighbor network device to be the SN is determined based on the radio frequency information supported by the terminal device.

When the capability information of the neighbor network device includes the load indication information, a target network device is selected from the at least one neighbor network device based on a load condition of the at least one neighbor network device and configured to be an SN. For the load indication information, i.e., information indicating the network load condition, the MN may determine to select a final target SN for configuration based on load conditions corresponding to multiple optional SNs. Moreover, the target SN may also be selected based on signal quality, capability information, and the like of the multiple optional SNs (i.e., multiple neighbor network devices). For example, the signal quality is greater than a first preset threshold value, and the capability information needs to include preset capability information. Exhaustions are omitted herein.

When the capability information of the neighbor network device includes the TAC information, whether to configure the neighbor network device to be the SN is determined based on handover (HO) limit information of the terminal device from a core network.

Specifically, the operation of determining whether to configure the neighbor network device to be the SN based on the HO limit information of the terminal device from the core network includes, when the HO limit information of the terminal device from the core network is that a TAC corresponding to the neighbor network device is an access barring TAC, the neighbor network device is not configured to be the SN.

For the TAC information, an MN side may consider UE HO limit information from the core network. For example, if a target TAC is a UE access barring TAC, the MN may not add the neighbor network device to be a target SN, otherwise may determine whether to add it to be the SN based on the other capability information of the neighbor network device. The other capability information may be at least one specified kind of capability information. Exhaustions are omitted herein.

It can be seen that, with adoption of the solution, the network device may perform capability information interaction with the neighbor network device and/or neighbor cell thereof to further complete radio resource configuration for the terminal device, so that a requirement of the terminal device may be met better during radio resource configuration, and utilization efficiency of a system radio resource may be improved.

An embodiment of the disclosure provides a method for capability interaction, which is applied to a terminal device and includes: sending a measurement report to a network device. The measurement report at least includes: capability information of at least one neighbor network device and/or at least one neighbor cell, and identification information of the at least one neighbor network device or the at least one neighbor cell.

In the embodiment, the network device may be a base station in an NR, eLTE or another communication system, and may further be an MN. Correspondingly, the neighbor network device may be a base station neighboring to the network device, i.e., the MN, or may be a base station determined whether to be added to be an SN for the MN.

Before such processing is executed, the method may further include receiving a measurement configuration sent by the network device. The measurement configuration is used for indicating the identification information of the neighbor network device and/or neighbor cell that the terminal device needs to measure.

That is, the terminal device in coverage is notified of information of the neighbor network device and neighbor cell to be measured by the terminal device at first, and then the terminal device acquires the capability information of the neighbor network device and the neighbor cell.

The capability information includes, but is not limited to: connectable core network information (for example, an EPC, and/or a 5GC, and/or both), an NE-DC capability support indication, an SRB3 capability support indication, a split SRB1 capability support indication, a split SRB2 capability support indication, a DC-based PDCP duplication capability support indication, a CA-based PDCP duplication capability support indication, radio frequency information, load indication information, or TAC information.

The terminal device may further receive the capability information broadcast by the neighbor network device and/or the neighbor cell.

Descriptions will be made with the condition that the network device is a base station 2 and the neighbor network device is a base station 1 as an example.

The base station 1 (which may also be the base station 1 and the base station 2) node and/or a cell broadcast/broadcasts capability information of the base station and/or the cell.

The base station 2 configures the terminal device to execute measurement, indicates identification information of a neighbor base station and/or neighbor target cell that the terminal device needs to measure in a measurement configuration, and requires UE to report capability information of the neighbor base station and/or the neighbor cell.

The base station 2 receives a measurement report from the terminal device. The measurement report at least includes: capability information of at least one neighbor network device or at least one neighbor cell, and identification information of the at least one neighbor network device or the at least one neighbor cell.

The base station 2, after acquiring the measurement report of the terminal device, adds the capability information of the neighbor network device or the neighbor cell into a neighbor cell relation list, based on the capability information of the at least one neighbor network device and/or the at least one neighbor cell sent by the terminal device. That is, the capability information of the neighbor base station and/or the neighbor cell is maintained in an ANR. In other words, the capability information of the neighbor base station and/or the neighbor cell is added into the neighbor cell relation list.

The operation of determining radio resource configuration for at least one terminal device based on the capability information of the neighbor network device and/or the at least one neighbor cell, may include: determining whether to configure, for the terminal device, a corresponding SN; when the network device is the MN, determining whether the neighbor network device can be added to be the SN of the terminal device based on the capability information of the neighbor network device and/or the neighbor cell, such that radio resource configuration for the terminal device may be implemented.

It can be seen that, with adoption of the solution, the network device may perform capability information interaction with the neighbor network device and/or neighbor cell thereof to further complete radio resource configuration for the terminal device, so that a requirement of the terminal device may be met better during radio resource configuration, and utilization efficiency of a system radio resource may be improved.

Figure 7:
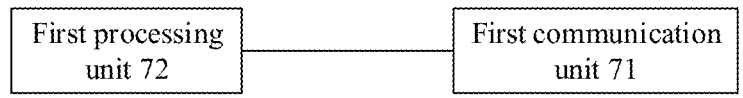
FIG. 7 is a composition structure diagram of a network device according to an embodiment of the disclosure.

As illustrated in FIG. 7, an embodiment of the disclosure provides a network device, which includes a first communication unit 71 and a first processing unit 72.

The first communication unit 71 is configured to acquire capability information of at least one neighbor network device and/or at least one neighbor cell.

The first processing unit 72 is configured to determine a radio resource configuration for at least one terminal device based on the capability information of the neighbor network device and/or the at least one neighbor cell.

In the embodiment, the network device may be a base station in an NR, eLTE or another communication system, and may further be an MN. Correspondingly, the neighbor network device may be a base station neighboring to the MN or may be a base station determined whether to be added to be an SN for the MN.

The operation of acquiring the capability information of the neighbor network device and the neighbor cell may include the following two manners.

A first manner: the first communication unit 71 is configured to acquire the capability information of the at least one neighbor network device and/or the at least one neighbor cell through an Xn interface with the at least one neighbor network device.

It is to be pointed out that, in this processing manner, the capability information of the neighbor network device acquired through the Xn interface may be cell-granularity-based capability information. That is, the capability information of the neighbor network device and the capability information of the at least one neighbor cell managed by the neighbor network device may be acquired.

The capability information includes at least one of: connectable core network information, an NE-DC capability support indication, an SRB3 capability support indication, a split SRB1 capability support indication, a split SRB2 capability support indication, a DC-based PDCP duplication capability support indication, a CA-based PDCP duplication capability support indication, radio frequency information, load indication information, or TAC information.

A Second Manner

The first communication unit 71 is configured to acquire a measurement report from the terminal device. The measurement report at least includes: the capability information of the at least one neighbor network device or the at least one neighbor cell, and identification information of the at least one neighbor network device or the at least one neighbor cell.

Before such processing is executed, the first communication unit 71 is configured to send a measurement configuration to the terminal device. The measurement configuration is used for indicating the identification information of the neighbor network device and/or neighbor cell that the terminal device needs to measure.

That is, the terminal device in coverage is notified of information of the neighbor network device and neighbor cell to be measured by the terminal device at first, and then the terminal device acquires the capability information of the neighbor network device and the neighbor cell.

It is also to be understood that, in this manner, the network device may further execute the following processing: the first communication unit 71 is configured to broadcast the capability information of the network device and/or the cell.

The capability information includes, but not limited to: the connectable core network information (for example, an EPC, and/or a 5GC, and/or both), the NE-DC capability support indication, the SRB3 capability support indication, the split SRB1 capability support indication, the split SRB2 capability support indication, the DC-based PDCP duplication capability support indication, the CA-based PDCP duplication capability support indication, the radio frequency information, the load indication information, or the TAC information.

Descriptions will be made with the condition that the network device is a base station 2 and the neighbor network device is a base station 1 as an example.

The base station 1 (which may also be the base station 1 and the base station 2) node and/or a cell broadcast/broadcasts capability information of the base station and/or the cell.

The base station 2 configures the terminal device to execute measurement, indicates identification information of a neighbor base station and/or neighbor target cell that the terminal device needs to measure in a measurement configuration, and requires UE to report capability information of the neighbor base station and/or the neighbor cell.

The base station 2 receives a measurement report from the terminal device. The measurement report at least includes: capability information of at least one neighbor network device or at least one neighbor cell, and identification information of the at least one neighbor network device or the at least one neighbor cell.

The base station 2, after acquiring the measurement report of the terminal device, adds the capability information of the neighbor network device or the neighbor cell into a neighbor cell relation list based on the capability information of the at least one neighbor network device and/or the at least one neighbor cell sent by the terminal device. That is, the capability information of the neighbor base station and/or the neighbor cell is maintained in an ANR. In other words, the capability information of the neighbor base station and/or the neighbor cell is added into the neighbor cell relation list.

The operation of determining the radio resource configuration for the at least one terminal device based on the capability information of the neighbor network device and/or the at least one neighbor cell may include: determining whether to configure, for the terminal device, a corresponding SN. That is, when the network device is the MN, whether the neighbor network device may be added to be the SN of the terminal device is determined based on the capability information of the neighbor network device and/or the neighbor cell, such that radio resource configuration for the terminal device is implemented. Specific descriptions will be made below.

The first processing unit 72 is configured to determine whether to configure the neighbor network device to be an SN according to the capability information of the neighbor network device and the measurement report of the terminal device for the neighbor network device.

When the neighbor network device is added to be the SN, requirement information is configured for the neighbor network device through the first communication unit.

The requirement information includes at least one of: an SN-side SRB3 configuration requirement indication, an SN-side split SRB1 configuration requirement indication, an SN-side split SRB2 configuration requirement indication, an SN-side DC configuration-based PDCP duplication requirement indication as well as a corresponding DRB identifier, or an SN-side CA configuration-based PDCP duplication requirement indication as well as a corresponding DRB identifier.

It is to be pointed out that, when the requirement information is configured for the neighbor network device, the neighbor network device may further determine whether it supports the requirement(s) according to the requirement information, and if NO, does not make any configuration and may further notify the network device of feedback information indicating that it does not support at least one of the requirement(s).

Furthermore, the first processing unit 72 is configured to determine whether to configure the neighbor network device to be the SN according to at least one of the following capability information of the neighbor network device and the measurement report of the terminal device for the neighbor network device:

the connectable core network information, the NE-DC capability support indication, the SRB3 capability support indication, the split SRB1 capability support indication, the split SRB2 capability support indication, the DC-based PDCP duplication capability support indication, or the CA-based PDCP duplication capability support indication.

The measurement report for the neighbor network device may further include information such as signal quality of the neighbor network device, and elaborations are omitted herein.

That is, whether to configure the neighbor network device to be the SN is determined based on the capability information of the neighbor network device and the measurement report including the signal quality thereof.

Furthermore, the first processing unit 72 is configured to execute at least one of the following processing based on the radio frequency information, the load indication information, and the TAC information.

When the capability information of the neighbor network device includes the radio frequency information, whether to configure the neighbor network device to be the SN is determined based on the radio frequency information supported by the terminal device.

When the capability information of the neighbor network device includes the load indication information, a target network device is selected from the at least one neighbor network device based on a load condition of the at least one neighbor network device and configured to be an SN. For the load indication information, i.e., information indicating the network load condition, the MN may determine to select a final target SN for configuration based on load conditions corresponding to multiple optional SNs. Moreover, the target SN may also be selected based on signal quality, capability information and the like of the multiple optional SNs (i.e., multiple neighbor network devices). For example, the signal quality is greater than a first preset threshold value, and the capability information needs to include preset capability information. Exhaustions are omitted herein.

When the capability information of the neighbor network device includes the TAC information, whether to configure the neighbor network device to be the SN is determined based on HO limit information of the terminal device from a core network.

Specifically, the first processing unit 72 is configured to, when the HO limit information of the terminal device from the core network is that a TAC corresponding to the neighbor network device is an access barring TAC, not configure the neighbor network device to be the SN.

For the TAC information, an MN side may consider UE HO limit information from the core network. For example, if a target TAC is a UE access barring TAC, the MN may not add the neighbor network device to be a target SN, otherwise may determine whether add the neighbor network device to be the SN based on the other capability information of the neighbor network device. The other capability information may be at least one specified kind of capability information. Exhaustions are omitted herein.

It can be seen that, with adoption of the solution, the network device may perform capability information interaction with the neighbor network device and/or neighbor cell thereof to further complete radio resource configuration for the terminal device, so that a requirement of the terminal device may be met better during radio resource configuration, and utilization efficiency of a system radio resource may be improved.

An embodiment of the disclosure provides a terminal device, which includes a second communication unit, configured to send a measurement report to a network device. The measurement report at least includes: capability information of at least one neighbor network device and/or at least one neighbor cell, and identification information of the at least one neighbor network device or the at least one neighbor cell.

In the embodiment, the network device may be a base station in an NR, eLTE or another communication system, and may further be an MN. Correspondingly, the neighbor network device may be a base station neighboring to the network device, i.e., the MN, or may be a base station determined whether to be added as an SN for the MN.

Before such processing is executed, the second communication unit is configured to receive a measurement configuration from the network device. The measurement configuration is used for indicating the identification information of the neighbor network device and/or neighbor cell that the terminal device needs to measure.

That is, the terminal device in coverage is notified of information of the neighbor network device and neighbor cell to be measured by the terminal device at first, and then the terminal device acquires the capability information of the neighbor network device and the neighbor cell.

The capability information includes, but not limited to: connectable core network information (for example, an EPC, and/or a 5GC, and/or both), an NE-DC capability support indication, an SRB3 capability support indication, a split SRB1 capability support indication, a split SRB2 capability support indication, a DC-based PDCP duplication capability support indication, a CA-based PDCP duplication capability support indication, radio frequency information, load indication information, or TAC information.

The second communication unit is configured to receive the capability information broadcast by the neighbor network device and/or the neighbor cell.

Descriptions will be made with the condition that the network device is a base station 2 and the neighbor network device is a base station 1 as an example.

The base station 1 (which may also be the base station 1 and the base station 2) node and/or a cell broadcast/broadcasts capability information of the base station and/or the cell.

The base station 2 configures the terminal device to execute measurement, indicates identification information of a neighbor base station and/or neighbor target cell that the terminal device needs to measure in a measurement configuration, and requires UE to report capability information of the neighbor base station and/or the neighbor cell.

The base station 2 receives a measurement report from the terminal device. The measurement report at least includes: capability information of at least one neighbor network device or at least one neighbor cell, and identification information of the at least one neighbor network device or the at least one neighbor cell.

The base station 2, after acquiring the measurement report of the terminal device, adds the capability information of the neighbor network device or the neighbor cell into a neighbor cell relation list based on the capability information of the at least one neighbor network device and/or the at least one neighbor cell sent by the terminal device. That is, the capability information of the neighbor base station and/or the neighbor cell is maintained in an ANR. In other words, the capability information of the neighbor base station and/or the neighbor cell is added into the neighbor cell relation list.

The operation of determining radio resource configuration for at least one terminal device based on the capability information of the neighbor network device and/or the at least one neighbor cell, may include: determining whether to configure, for the terminal device, a corresponding SN. That is, when the network device is the MN, whether the neighbor network device may be added to be the SN of the terminal device is determined based on the capability information of the neighbor network device and/or the neighbor cell, such that radio resource configuration for the terminal device is implemented.

It can be seen that, with adoption of the solution, the network device may perform capability information interaction with the neighbor network device and/or neighbor cell thereof to further complete radio resource configuration for the terminal device, so that a requirement of the terminal device may be met better during radio resource configuration, and utilization efficiency of a system radio resource may be improved.

Figure 8:
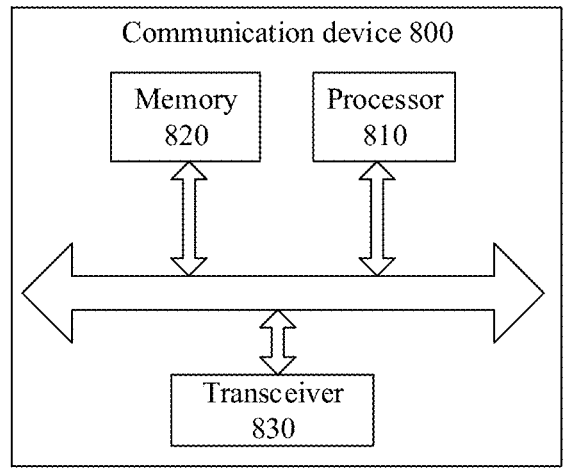
FIG. 8 is a composition structure diagram of a communication device according to an embodiment of the disclosure.

FIG. 8 is a schematic structure diagram of a communication device 800 according to an embodiment of the disclosure. The communication device 800 illustrated in FIG. 8 includes a processor 810, and the processor 810 may call and run a computer program in a memory to implement the method in the embodiment of the disclosure.

Alternatively, as illustrated in FIG. 8, the communication device 800 may further include the memory 820. The processor 810 may call and run the computer program in the memory 820 to implement the method in the embodiment of the disclosure.

The memory 820 may be an independent device independent of the processor 810, or may be integrated into the processor 810.

Alternatively, as illustrated in FIG. 8, the communication device 800 may further include a transceiver 830, and the processor 810 may control the transceiver 830 to communicate with another device, specifically sending information or data to the other device or receiving information or data sent by the other device.

The transceiver 830 may include a transmitter and a receiver. The transceiver 830 may further include antennae, and the number of the antennae may be one or more.

Alternatively, the communication device 800 may specifically be a network device of the embodiment of the disclosure, and the communication device 800 may implement corresponding flows implemented by the network device in each method of the embodiments of the disclosure. For simplicity, elaborations are omitted herein.

Alternatively, the communication device 800 may specifically be a terminal device or network device of the embodiment of the disclosure, and the communication device 800 may implement corresponding flows implemented by the mobile terminal/terminal device in each method of the embodiments of the disclosure. For simplicity, elaborations are omitted herein.

Figure 9:
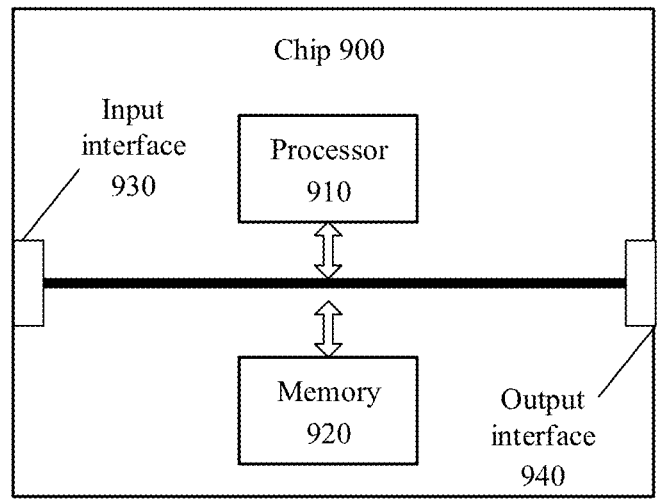
FIG. 9 is a schematic block diagram of a chip according to an embodiment of the disclosure.

FIG. 9 is a schematic structure diagram of a chip according to another embodiment of the disclosure. The chip 900 illustrated in FIG. 9 includes a processor 910, and the processor 910 may call and run a computer program in a memory to implement the method in the embodiment of the disclosure.

Alternatively, as illustrated in FIG. 9, the chip 900 may further include the memory 920. The processor 910 may call and run the computer program in the memory 920 to implement the method in the embodiment of the disclosure.

The memory 920 may be an independent device independent of the processor 910 or may be integrated into the processor 910.

Alternatively, the chip 900 may further include an input interface 930. The processor 910 may control the input interface 930 to communicate with another device or chip, specifically acquiring information or data sent by the other device or chip.

Alternatively, the chip 900 may further include an output interface 940. The processor 910 may control the output interface 940 to communicate with the other device or chip, specifically outputting information or data sent by the other device or chip.

Alternatively, the chip may be applied to the network device of the embodiment of the disclosure, and the chip may implement corresponding flows implemented by the network device in the method of the embodiment of the disclosure. For simplicity, elaborations are omitted herein.

Alternatively, the chip may be applied to the terminal device of the embodiment of the disclosure, and the chip may implement corresponding flows implemented by the terminal device in each method of the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 10:
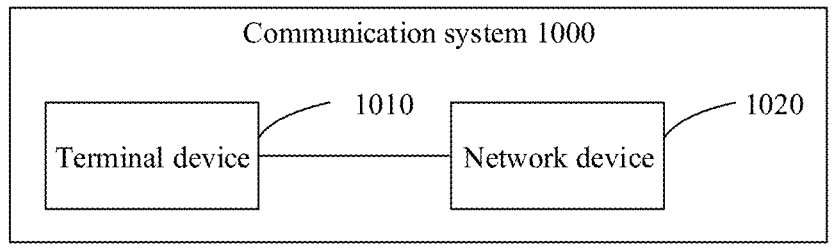
FIG. 10 is a second architecture diagram of a communication system according to an embodiment of the disclosure.

FIG. 10 is a second block diagram of a communication system 1000 according to an embodiment of the disclosure. As illustrated in FIG. 10, a communication system 1000 includes a terminal device 1010 and a network device 1020.

The terminal device 1010 may be configured to realize corresponding functions realized by the terminal device in the method, and the network device 1020 may be configured to realize corresponding functions realized by the network device in the method. For simplicity, elaborations are omitted herein.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Disclosure Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDRSDRAM, an ESDRAM, an SLDRAM and a DR RAM. That is, the memory in the embodiments of the disclosure is intended to include, but not limited to, memories of these and any other proper types.

An embodiment of the disclosure also provides a computer-readable storage medium, which is configured to store a computer program.

Alternatively, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Alternatively, the computer-readable storage medium may be applied to a mobile terminal/terminal device in the embodiments of the disclosure, and the computer program enables a computer to execute corresponding flows implemented by the terminal device in each method of the embodiments of the disclosure. For simplicity, elaborations are omitted herein.

An embodiment of the disclosure further provides a computer program product, which includes a computer program instruction.

Alternatively, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Alternatively, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

An embodiment of the disclosure further provides a computer program.

Alternatively, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Alternatively, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for capability interaction, executed by a network device, the method comprising:
   acquiring capability information of at least one neighbor network device and/or at least one neighbor cell;
   determining a radio resource configuration for at least one terminal device based on the capability information of the neighbor network device and/or the at least one neighbor cell, wherein the capability information comprises an Evolved Universal Terrestrial Radio Access (E-UTRA)-New Radio (NR)-(EN) dual connectivity (DC) capability support indication, radio frequency information, and tracking area code (TAC) information; and
   when the capability information of the neighbor network device comprises the TAC information, and handover (HO) limit information of the terminal device from the core network is that a TAC corresponding to the neighbor network device is an access barring TAC, not configuring the neighbor network device to be a secondary node (SN).

2. The method of claim 1, wherein the acquiring the capability information of the at least one neighbor network device and/or the at least one neighbor cell comprises:
   acquiring the capability information of the at least one neighbor network device and/or the at least one neighbor cell through an Xn interface with the at least one neighbor network device.

3. The method of claim 1, wherein the capability information further comprises at least one of:
   connectable core network information, a signaling radio bearer 3 (SRB3) capability support indication, a split SRB1 capability support indication, a split SRB2 capability support indication, a DC-based packet data convergence protocol (PDCP) duplication capability support indication, a carrier aggregation (CA)-based PDCP duplication capability support indication, or load indication information.

4. The method of claim 1, further comprising:
   determining whether to configure the neighbor network device to be the SN, according to the capability information of the neighbor network device and a measurement report of the terminal device for the neighbor network device.

5. The method of claim 4, further comprising at least one of:
   when the capability information of the neighbor network device comprises the radio frequency information, determining whether to configure the neighbor network device to be the SN based on the radio frequency information supported by the terminal device; or
   when the capability information of the neighbor network device comprises load indication information, selecting a target network device from the at least one neighbor network device based on a load condition of the at least one neighbor network device, and configuring the target network device to be the SN.

6. A method for capability interaction, executed by a terminal device, the method comprising:
   sending a measurement report to a network device, wherein the measurement report at least comprises: capability information of at least one neighbor network device and/or at least one neighbor cell, and identification information of the at least one neighbor network device or the at least one neighbor cell, wherein the capability information comprises an Evolved Universal Terrestrial Radio Access (E-UTRA)-New Radio (NR)-(EN) dual connectivity (DC) capability support indication, radio frequency information, and tracking area code (TAC) information, wherein when the capability information of the neighbor network device comprises the TAC information, and handover (HO) limit information of the terminal device from the core network is that a TAC corresponding to the neighbor network device is an access barring TAC, the neighbor network device is not configured to be a secondary node (SN).

7. The method of claim 6, before sending the measurement report to the network device, further comprising:
receiving a measurement configuration from the network device, wherein the measurement configuration is used for indicating at least one of the following information that the terminal device needs to measure:
the identification information of the neighbor network device; or
the identification information of the neighbor cell.

8. The method of claim 6, further comprising:
receiving the capability information broadcast by at least one of the neighbor network device or the neighbor cell.

9. The method of claim 6, wherein the capability information further comprises at least one of:
connectable core network information, a signaling radio bearer 3 (SRB3) capability support indication, a split SRB 1 capability support indication, a split SRB2 capability support indication, a DC-based packet data convergence protocol (PDCP) duplication capability support indication, a carrier aggregation (CA)-based PDCP duplication capability support indication, or load indication information.

10. A network device, comprising:
a transceiver, configured to acquire capability information of at least one neighbor network device and/or at least one neighbor cell; and
a processor, configured to determine a radio resource configuration for at least one terminal device based on the capability information of the neighbor network device and/or the at least one neighbor cell,
wherein the capability information comprises an Evolved Universal Terrestrial Radio Access (E-UTRA)-New Radio (NR)(EN)-dual connectivity (DC) capability support indication, radio frequency information, and tracking area code (TAC) information,
wherein the processor is configured not to, when the capability information of the neighbor network device comprises the TAC information, and handover (HO) limit information of the terminal device from the core network is that a TAC corresponding to the neighbor network device is an access barring TAC, configure the neighbor network device to be a secondary node (SN).

11. The network device of claim 10, wherein the transceiver is configured to acquire the capability information of the at least one neighbor network device and/or the at least one neighbor cell through an Xn interface with the at least one neighbor network device.

12. The network device of claim 10, wherein the capability information further comprises at least one of:
connectable core network information, a signaling radio bearer 3 (SRB3) capability support indication, a split SRB1 capability support indication, a split SRB2 capability support indication, a DC-based packet data convergence protocol (PDCP) duplication capability support indication, a carrier aggregation (CA)-based PDCP duplication capability support indication, or load indication information.

13. The network device of claim 10, wherein the processor is further configured to determine whether to configure the neighbor network device to be the SN, according to the capability information of the neighbor network device and a measurement report of the terminal device for the neighbor network device.

14. The network device of claim 13, wherein the processor is further configured to execute at least one of the following processing:
when the capability information of the neighbor network device comprises the radio frequency information, determining whether to configure the neighbor network device to be the SN in combination with the radio frequency information supported by the terminal device; or
when the capability information of the neighbor network device comprises the load indication information, selecting a target network device from the at least one neighbor network device based on a load condition of the at least one neighbor network device, and configuring the target network device to be the SN.

15. A terminal device, comprising:
a transceiver, configured to send a measurement report to a network device, wherein the measurement report at least comprises capability information of at least one neighbor network device and/or at least one neighbor cell, and identification information of the at least one neighbor network device or the at least one neighbor cell,
wherein the capability information comprises an Evolved Universal Terrestrial Radio Access (E-UTRA)-New Radio (NR)(EN)-dual connectivity (DC) capability support indication, radio frequency information, and tracking area code (TAC) information,
wherein when the capability information of the neighbor network device comprises the TAC information, and handover (HO) limit information of the terminal device from the core network is that a TAC corresponding to the neighbor network device is an access barring TAC, the neighbor network device is not configured to be a secondary node (SN).

16. The terminal device of claim 15, wherein the transceiver is configured to receive a measurement configuration sent by the network device, wherein the measurement configuration is used for indicating at least one of the following information that the terminal device needs to measure:
the identification information of the neighbor network device; or
the identification information of the neighbor cell.

17. The terminal device of claim 15, wherein the transceiver is configured to receive the capability information broadcast by at least one of the neighbor network device or the neighbor cell.

18. The terminal device of claim 15, wherein the capability information further comprises at least one of:
connectable core network information, a signaling radio bearer 3 (SRB3) capability support indication, a split SRB 1 capability support indication, a split SRB2 capability support indication, a DC-based packet data convergence protocol (PDCP) duplication capability support indication, a carrier aggregation (CA)-based PDCP duplication capability support indication, or load indication information.

\* \* \* \* \*